United States Patent
Kuo et al.

(10) Patent No.: US 8,601,416 B2
(45) Date of Patent: Dec. 3, 2013

(54) METHOD OF CIRCUIT DESIGN YIELD ANALYSIS

(75) Inventors: Chin-Cheng Kuo, Taoyuan (TW); Wei-Yi Hu, Zhubei (TW); Jui-Feng Kuan, Zhubei (TW); Yi-Kan Cheng, Taipei (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 0 days.

(21) Appl. No.: 13/535,709

(22) Filed: Jun. 28, 2012

(65) Prior Publication Data

US 2013/0246986 A1    Sep. 19, 2013

Related U.S. Application Data

(60) Provisional application No. 61/611,246, filed on Mar. 15, 2012.

(51) Int. Cl.
G06F 17/50    (2006.01)

(52) U.S. Cl.
USPC .............. 716/106; 716/56; 716/111; 716/136

(58) Field of Classification Search
USPC .......................... 716/56, 100, 106, 111, 136
See application file for complete search history.

(56) References Cited

U.S. PATENT DOCUMENTS 5,418,974 A * 5/1995 Craft et al. .................... 716/111
6,807,652 B2 * 10/2004 McConaghy ................. 716/132
7,853,902 B2 * 12/2010 Bromberger ................. 716/132
2006/0273266 A1 * 12/2006 Preil et al. .................... 250/548
2007/0129838 A1 * 6/2007 Bendix ......................... 700/121

OTHER PUBLICATIONS

Gibson et al.,"Statistically Based Parametric Yield Prediction for Integrated Circuits", Nov. 1997, IEEE Transactions on Semiconductor Manufacture, vol. 10, iss. 4, pp. 445-458.*
Maly, "Computer-Aided Design for VLSI Circuit Manufacturability", Feb. 1990, Proceedings of the IEEE, vol. 78, iss. 2, pp. 356-392.*
Pei-Wen Luo,"Design Methodology for Yield Enhancement of Switched-Capacitor Analog Integrated Circuit", Jan. 2011, National Central University, Taiwan, ROC, Disseration—one set.*
Topaloglu, R.O., "Monte Carlo-Alternative Probabilistic Simulations for Analog Systems", Proceedings of the 7th International Symposium on Quality Electric Design, ISQED'06, Mar. 2006, 5 pages.
Topoaloglu, R.O.,"Early, Accurate and Fast Yield Estimation Through Monte Carlo-Alternative Probabilistic Behavioral Analog System Simulation", Proceedings of the 24th IEEE VLSI Test Symposium, Apr. 2006, 6 pages.

* cited by examiner

*Primary Examiner* — Sun Lin
(74) *Attorney, Agent, or Firm* — Duane Morris LLP; Steven E. Koffs

(57) ABSTRACT

A method includes (a) generating a set of samples, each sample representing a respective set of semiconductor fabrication process variation values; (b) selecting a first subset of the set of samples based on a probability of the set of semiconductor fabrication process variation values corresponding to each sample; (c) estimating a yield measure for a semiconductor product based on relative sizes of the set of samples and the first subset, without performing a Monte Carlo simulation; and (d) outputting an indication that a design modification is appropriate, if the estimated yield measure is below a specification yield value.

22 Claims, 6 Drawing Sheets

METHOD OF CIRCUIT DESIGN YIELD ANALYSIS

This application claims the benefit of U.S. Provisional Patent Application No. 61/611,246, filed Mar. 15, 2012, which is expressly incorporated by reference herein in its entirety.

FIELD

This disclosure is related to computer implemented simulation and analysis tools for supporting integrated circuit design.

BACKGROUND

Device size scaling significantly increases the impact of parametric variability on design performances, especially for sensitive circuits. Monte Carlo (MC) simulation is a conventional methodology to statistically analyze the parametric yield under process variations. In traditional MC analysis, pseudo-random sampling (PRS) is used to generate input samples for simulation. Based on a pseudo-random numbers, small variations in one or more process parameters are selected, to define the process conditions, and a SPICE simulation of a device or circuit design is run, assuming that the process selected parameters are used. This is repeated for a large number of pseudo-random numbers (and corresponding process conditions). However, traditional MC analysis often requires several thousand SPICE simulations such that the iterative yield-aware design flow at circuit-level becomes impractical for large circuits.

The traditional PRS approach often requires huge amount of simulation time for accurate yield estimation for a single design. If the designer makes a design change, this large simulation time is repeated.

DETAILED DESCRIPTION

This description of the exemplary embodiments is intended to be read in connection with the accompanying drawings, which are to be considered part of the entire written description.

This disclosure describes an efficient trimmed-sample Monte Carlo (MC) methodology and yield-aware design flow for circuits, such as, but not limited to, analog circuits. This approach focuses on "trimming simulation samples" to speedup MC analysis. Estimates of the best possible yield and the worst performance are provided "before" performing MC simulation, such that designers can postpone the MC analysis and start improving circuits immediately. After the circuit design is improved, the MC analysis can be performed. Moreover, this method can also combine with variance reduction techniques or low discrepancy sequences to further reduce the MC cost. Using Latin Hypercube Sampling (LHS) as an example, this approach gives 29× to 54× speedup over traditional MC analysis and the yield estimation errors are all less than 1%. For system designs, the provided yield analysis flow is still efficient for high-level MC analysis.

In this disclosure, an efficient trimmed-sample MC methodology and new yield-aware design flow are provided to speed up circuit designs for yield. This method is a simulation-based methodology to keep good accuracy. The parametric effects can be estimated quickly, such that designers can fine-tune circuits earlier, if the yield value is less than desired. Therefore, the sign-off full MC simulation is not performed for detailed analysis until the design yield has achieved the target value.

This methodology aims at "trimming samples" no matter which sampling technique is used in MC analysis. In other words, it is not necessary to improve the algorithms that are performed for each sample simulated (e.g., LHS and LDS), but the benefit of any algorithm used can be maintained, and their simulation cost can be further reduced.

Figure 1:
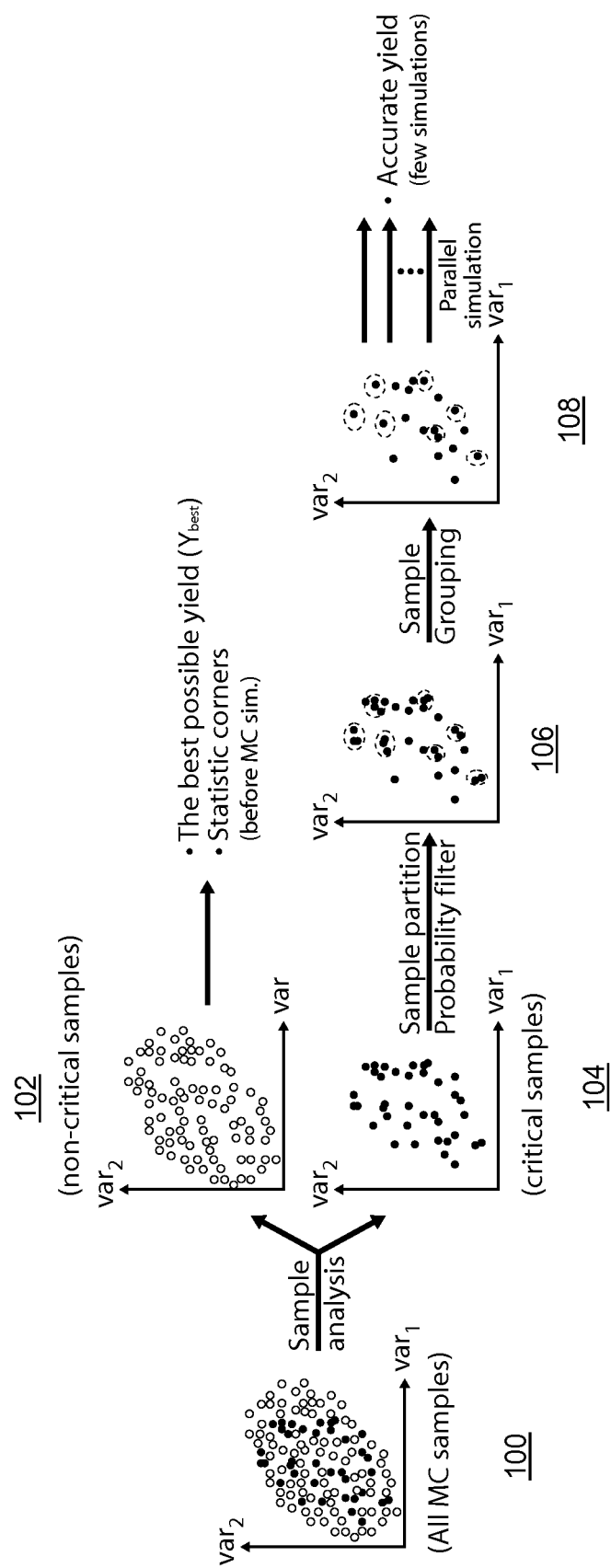
FIG. 1 schematically shows trimming of the sample space for Monte Carlo simulation, according to an embodiment.
Figure 2:
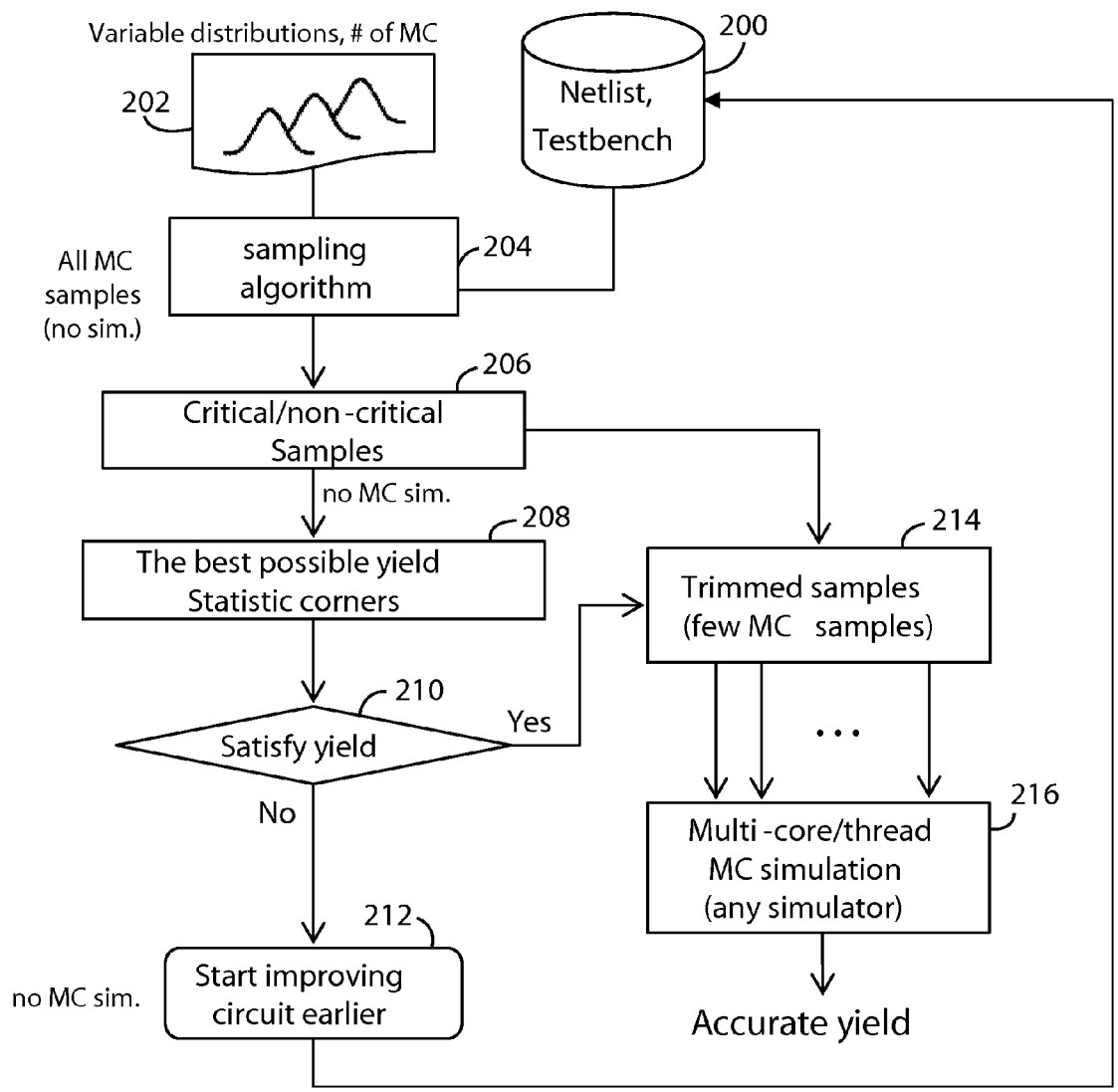
FIG. 2 is a flow chart of an embodiment of the method.

FIG. 1 schematically shows the trimming of the sample space, and FIG. 2 is a flow chart of the a fast MC yield analysis according to one embodiment.

Referring first to FIG. 1, the tool generates the full set of all samples 100 of the semiconductor fabrication process space according to the user-given parametric variations and simulation count of MC. This sample includes a full range of process variations, according to the known or estimated process probability density function. The algorithm provided herein trims these MC samples and selects only the samples which are likely to fail for simulation.

The full set of samples is divided into a subset 104 of critical samples and a subset 102 of non-critical samples. The size of the non-critical sample space provides an initial estimate of the best possible yield (statistical corners) without performing an MC simulation. If this estimate indicates an unsatisfactory yield, the designer can proceed directly to design improvement without performing the lengthy MC simulation. This process can be repeated any number of times, until the preliminary yield estimate is satisfactory.

In some embodiments, if the initial estimate of the yield is satisfactory, the critical samples are then filtered by a probability filter to provide a further reduced sample space 106.

In some embodiments, data points which are very close to each other are replaced by a single point, to provide the final sample space 108. The data points in the final sample space can be processed using individual SPICE simulation runs. Because the size of the sample space is reduced, When the MC simulation is performed, the results for data points which represent two or more of the original sample points are weighted according to the number of original points they represent. Thus, for example, if three nearby data points are replaced by one representative point, the results of simulating that representative point are counted as though three data points had achieved the same performance result.

Referring now to FIG. 2, in some embodiments, this algorithm includes the following steps:

The inputs are provided to the computer implemented tool. The inputs include a non-transitory, computer readable storage medium 200 including a netlist of the design. In some embodiments, the design may be a standard cell for use in a cell library. In some embodiments, the design may be a function or an integrated circuit (IC). The testbench includes any additional information which is needed to perform MC simulation.

Also provided is the probability density function 202 for the MC simulation. This function includes the probability density function for the process variations to be simulated. These variations can include chamber temperature, pressure, ion density, bias voltage, or the like.

At block 204, a sampling algorithm is used. For example, in some embodiments, a pseudo random number generator generates a plurality of numbers, and the distributions 202 are used to select the combination of process conditions for a single SPICE simulation. This set of conditions constitutes a single sample. A complete sample space is generated by repeating this step for the desired number of samples to be used in a full MC simulation.

At step 206, a sample analysis is performed. This step finds the relationships (e.g., linear relationships) between input variables (process conditions) and the concerned device (or circuit) performance. Such models are principally used to pick out the samples whose performances are far from specification (identify the critical and non-critical samples). This method treats such far-from-specification samples as pass/fail samples directly without simulation.

In some embodiments, other types of regression models (either first order models or higher-order models) are used, instead of linear relationships. Thus, although an example using linear modelling is described below for ease of understanding, the technique is also used with higher-order models.

At step 208, an estimate of the best possible yield (Ybest) can be obtained from these samples "before" MC simulation. This estimate of best possible yield Ybest is likely to be more optimistic than the actual yield. The worst performance case is also found from the fail samples. This worst performance value is not used for the decision of step 210, but the designer can use this information in determining how large a design modification to make.

At step 210, if this optimistic estimate of best possible yield Ybest does not satisfy the desired yield criterion, this implies that the real yield after expensive MC analysis would be worse and more unacceptable, and step 212 is performed next. Based on the knowledge that even this optimistic estimate Ybest shows unsatisfactory yield, the designer can determine that he/she should modify the design without the need to do further, expensive MC simulation. In other words, this method can provide a quick yield reference for designers without running full MC simulations. If the optimistic estimate of best possible yield Ybest is satisfactory, then step 214 is performed, to proceed to the MC simulation, to obtain a more accurate assessment of yield.

At step 212, the designer can proceed directly to making the design change, without performing the MC simulation. This concept is useful to fasten the iterative yield check during circuit designs for yield. Once the design modification is determined, steps 204-210 are repeated with the new design netlist.

At step 214, the tool automatically analyzes the sample space to reduce the number of individual SPICE simulations to be run by the MC simulation. In some embodiments, the sample trimming includes:

Sample partition & probability filter: As to the samples whose device/circuit performances are near the specification, these samples would dominate the value of yield analysis. Therefore, circuit simulations are appropriate for them to verify whether to pass or fail the performance specification. The steps of "Sample partition" and "probability filter" would select critical ones from the full set of samples in order to reduce the simulation count.

Sample grouping: After previous steps, the selected samples are quite fewer than the original MC space. "Sample grouping" would further trim these simples to avoid running similar simulations.

At step 216, this embodiment only simulates the samples which could possibly fail to verify the relative performances under process variations. Because these selected samples have a high probability of violating the specification, the analyzed yield from MC simulation results is always lower than the value of Ybest. This is why the estimate Ybest is a reliable reference for designers to start improving their circuits earlier before MC simulation. This method indeed estimates accurate yield value and similar result of the worst performance compared to full MC simulation. Further, this methodology can combine with variance reduction techniques or low discrepancy sequences to further speed up traditional MC analysis.

The remainder of this detailed description is organized as follows. Section 2 introduces the MC analysis and trimmed-sample concepts. The provided trimmed-sample methodology is explained in Section 3. The provided yield-aware design flow is introduced in Section 4.

In this section, a single variable and single output are used to explain the trimmed-sample concepts. This method can handle numerous variables, but the single variable example is discussed for ease of understanding.

2.1 Monte Carlo Analysis

The device parameter variation can be described by a Gaussian distribution. A Gaussian random variable tends to cluster around the mean value ($\mu$) such that the mean's probability is the highest. Far from cluster, the probability of variable value is much lower. The parameter a represents the standard deviation.

Monte Carlo methods in yield analysis use repeated random sampling to determine the process variation effects on circuit performance. Pseudo-random sampling (PRS) algorithms are used in MC analysis to generate a variable value from a Gaussian distribution. Then, circuit simulators use the sampled value to run simulation and find the relative output performance. Therefore, the probability of an output value should be relative (not equal) to the probability of the input variable no matter what relationships they have. In other words, the distributions of circuit performances also have clusters and the probability of a value being far-from-cluster is much lower, as illustrated by regions 501 and 503 in FIG. 5.

By repeating the steps of sampling and simulation, an output distribution can be constructed after hundreds or thousands of iterations. Referring to the given specification, the yield value can be calculated by Yield$\approx$1−(Nfail/Ntotal). Ntotal represents the number of total samples in MC and Nfail is the number of failed samples which violate the specification. Ntotal is known because the user specifies the simulation count of MC for circuit simulators. Therefore, finding out the failed samples can provide the yield value. This implies that simulating all MC samples for yield estimation is not necessary to find the value of Nfail, because a subset containing only the critical samples can be simulated. These critical samples are those which have high probability to violate the specification.

2.2 Trimmed-Sample Method

From the above observation, the trimmed-sample method includes selecting the possible failed samples and simulating theses samples only. Then, a more accurate estimate of the yield value is obtained, because the number of failed samples is found from simulation results.

Figure 5:
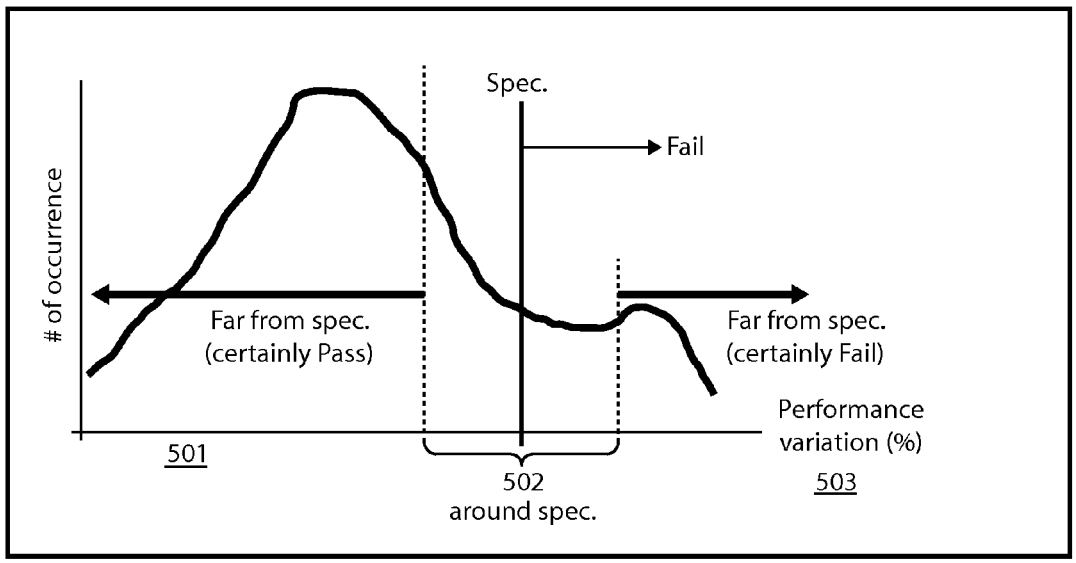
FIG. 5 is a diagram showing the partitioning of the sample space for preliminary statistical information.

FIG. 5 illustrates that the performance distribution can be classified into regions if the specification value is known. The output performances far from specification imply that these samples certainly pass (region 501) or fail (region 503) the design requirement. Therefore, the worst performance is found from these samples and a rough yield value is estimated. Without considering the samples in the around-specification region 502, this rough yield is always more optimistic than the real yield value, such that it is referred to herein as "the best possible yield (Ybest)". That is, assuming that all the samples in region 501 are certain to pass the specification, the best possible yield Ybest represents the case in which all of the samples in region 502 also meet specification. Thus, Ybest is given by 1—(percentage of samples in region 503). Because the real yield is expected to be lower than Ybest, if Ybest is worse than the target yield, designers can stop MC analysis (or not perform the analysis if it has not yet begun) because the real yield after MC is much worse and certainly unsatisfied.

If Ybest fits the yield requirement, the around-specification samples (region 502) become critical and dominate the real yield value. However, simulating all samples in this region is still relatively inefficient. Some embodiments utilize the probability features of MC analysis to pick out critical samples and group these samples to avoid performing duplicate SPICE simulations. Therefore, some embodiments use an efficient trimmed-sample MC methodology for simulation-based yield analysis. This approach is independent of the sampling algorithm and users can combine this approach with variance reduction techniques or low discrepancy sequences to further improve the efficiency of traditional MC approach.

3. Trimmed-Sample Methodology

Figure 3:
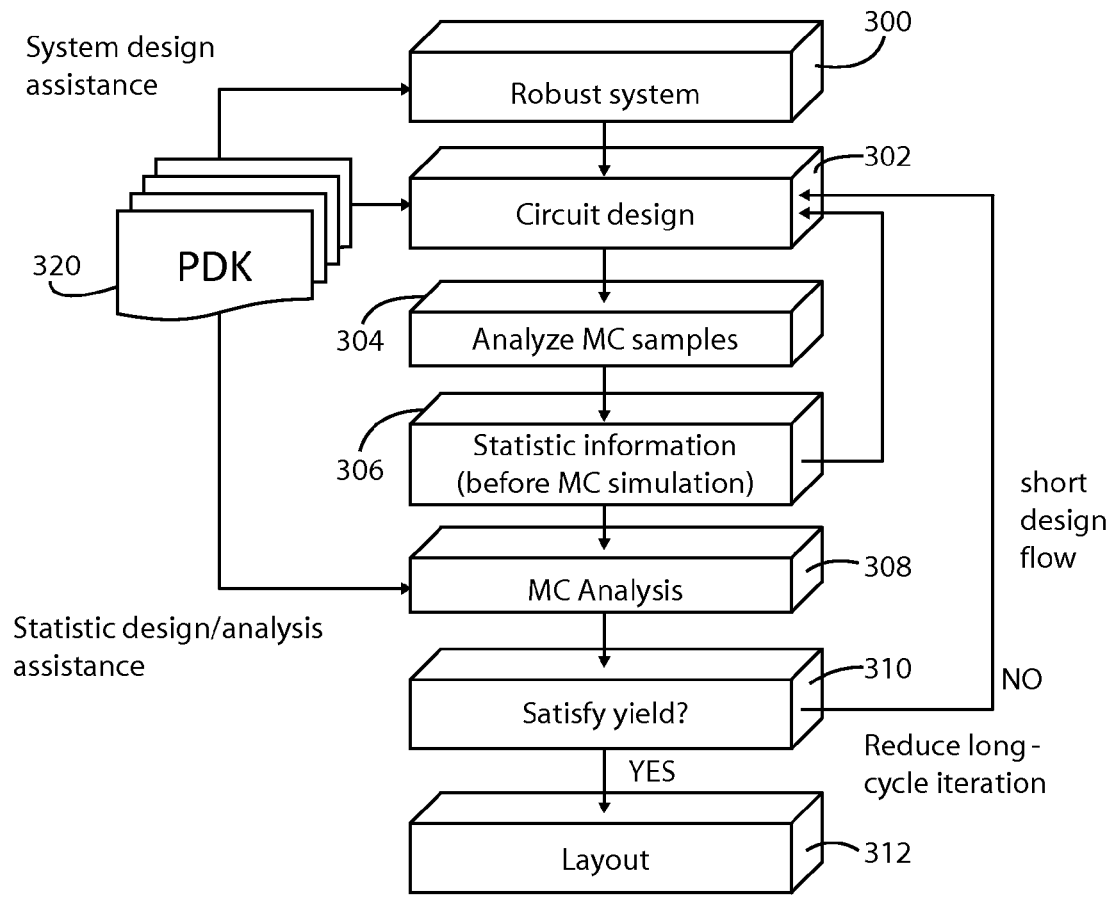
FIG. 3 is a flow chart of an embodiment of the method.

FIG. 3 is a flow chart of an embodiment of the method.

This method aims at "trimming MC samples" to reduce simulation cost. Therefore, the analysis begins with all MC samples as inputs and the test bench is also provided for simulations to find the concerned device/circuit performance, as shown in FIG. 2. FIG. 1 shows the trimmed-sample MC methodology of this method.

At step 300, a robust initial system design is begun using the process design kit (PDK) 320. The PDK includes a variety of automated design tools to assist the designer in the IC design process. For example, a foundry often provides a PDK 320 to its design customers. In some embodiments, the PDK includes computer implemented tools and data stored in a non-transitory computer readable storage medium.

At step 302, the designer uses the PDK 320 to develop a circuit design.

At step 304, the tool analyzes the MC samples. In some embodiments, the sensitivity analysis is performed in step 304. In other embodiments, the sensitivity analysis has been performed previously (e.g., during technology characterization), and the previously stored sensitivity values are retrieved from a machine readable storage medium. After applying the probability distribution, the sample space of circuit/device performance values is calculated based on the sensitivity (of performance to process variation).

At step 306, initial statistical information (including Ybest) is provided to the designer. If Ybest is lower than the yield required by the specification, then the designer can proceed to modify the design and repeat steps 302-306.

At step 308, if Ybest is within the specification, the designer proceeds to the MC analysis, using the trimmed sample set.

At step 310, if the more accurate yield value from the MC analysis of the trimmed sample set satisfies the yield specification, then step 312 is performed. If not another design modification is involved, and steps 302-310 are repeated.

At step 312, the accurate yield measure indicates that the design is ready to proceed to the layout stage.

Figure 4:
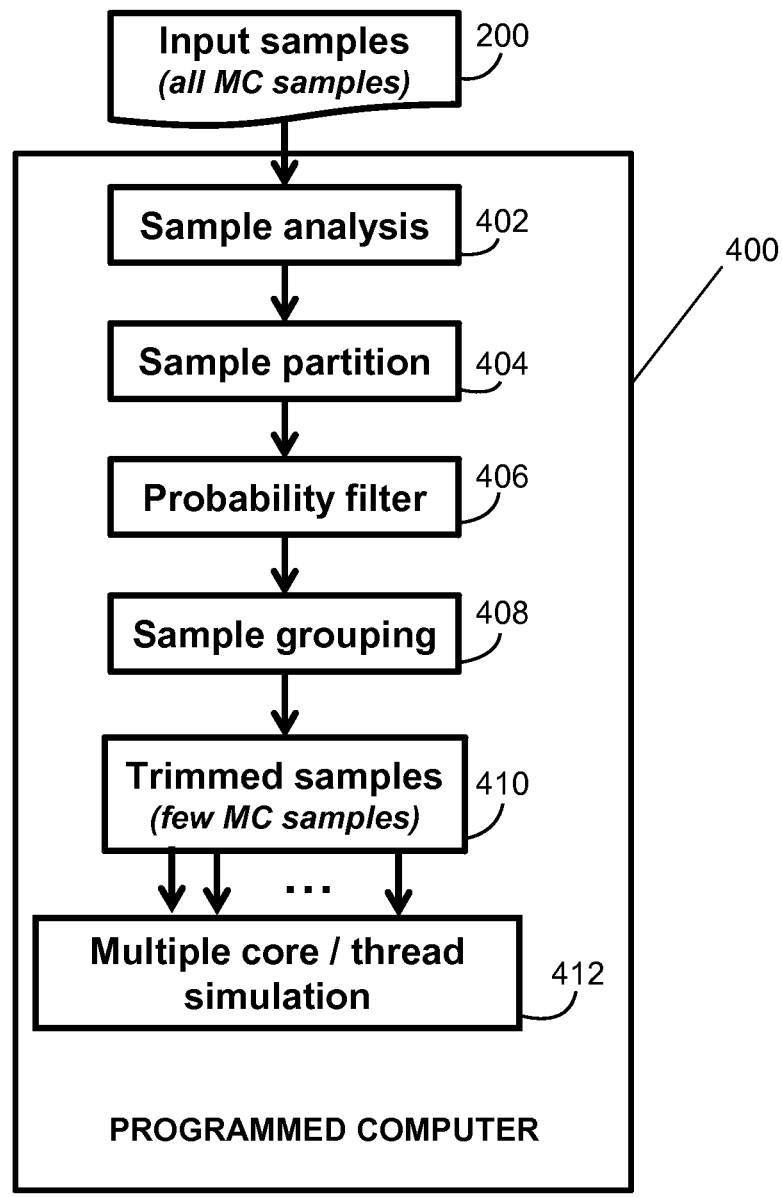
FIG. 4 is a block diagram of a computer implemented system for performing the method.

FIG. 4 is a block diagram of an exemplary computer implemented tool 400 for performing the method. The system is implemented in a programmed processor. Details of several of the blocks are provided below.

The tool 400 receives the full set of input samples from a storage medium.

Block 402 is the sample analysis function. This block determines relationships (sensitivities) between inputs (process conditions) and device or circuit performance. In the case of a device, a small number of SPICE simulations can identify these sensitivities. Block 402 can employ linear or higher order regression to determine sensitivities. In the case of analyzing a complete cell or circuit, the sensitivities of the individual devices may be provided by a small number of SPICE simulations for each device, or in some cases are provided from a previously performed design of experiment during technology characterization.

Block 404 is a sample partition block, which assigns each sample to a partition or bin depending on the distance between the sample-induced performance value(s) and the specification value. For example, in some embodiments, partitions are assigned based on the number of standard deviations between the circuit performance value and the specification.

Block 406 is the probability filter. This block selects for MC simulation a subset of the samples which are "around" the specification, for simulation.

Block 408 is the sample grouping function. This block employs a clustering algorithm to find groups of samples which are close to each other, and can be replaced by a single representative sample for simulation in.

Block 410 represents the trimmed sample set which is stored in a non-transitory, machine readable storage medium, and is provided to the MC simulator. In some embodiments, the simulator is a multiple core, multiple thread simulation, for faster parallel execution. In other embodiments, the simulator is run on a single core computer for single thread execution.

Block 412 is an MC simulator. A variety of MC simulators can be used. The sample trimming method and apparatus described herein speed up the total execution time, no matter what MC simulator is used.

Although the example of FIG. 4 uses both the probability filter 406 and the sample grouping block 108, in an alternative embodiment, the sample grouping block 108 is either not included in the system or is not used, to reduce run time. For example, if a good pseudo-random number generator is capable of creating a sample space with relatively little repetition of similar input values, then the configuration can provide acceptable results without the sample grouping block.

3.1 Sample Analysis

Initially, a complete sample space 100 is provided.

The first step is to model the relationships between input variables and the concerned device/circuit performance. This step picks out the far-from-specification samples to provide Ybest value and the worst performance before running MC simulation. Simple linear models and higher-order models are both qualified for this method.

In some embodiments, sensitivity analysis is used to model the parametric variation effects on the circuit performance.

For example, in some embodiments, the sensitivity of a device's performance to a process variable change is simulated using a small number (e.g., 2 to 5) of SPICE simulations for each process variable. The sensitivity to each process variable is determined by linear or higher-order regression from the SPICE results. Using the sensitivity, the variable value is changed by a small variation individually to find the variation effect on the concerned performance by simulations. In some embodiments, these small variations are the same, (e.g., 1 standard deviation or 1σ of each variable), such that the tool can sort their importance by the sensitivity values directly. Then, the input variables are classified into three levels: very important, important, and unimportant. For numerous variables, principle component analysis can be performed first to reduce the high-dimension MC samples by using only the first few principal components (PCs). Therefore, the modeling cost in this method is negligible compared to the huge amount of MC simulations. Moreover, these independent PCs can also convert the correlated variables into uncorrelated parameters. Therefore, correlations between input variables can be also handled in this method.

At the conclusion of the sample analysis, the samples are divided into the non-critical samples 102 and critical samples 104 of FIG. 1.

After sample analysis, the variable sensitivities (SEvar) are used for all MC samples to calculate the relative performance variations by equation (1) (for an example in which linear modeling is used).

$$[\underbrace{SE_{var_1} \quad SE_{var_2} \quad \ldots \quad SE_{var_n}}_{Sensitivity\ values}] \begin{bmatrix} \Delta Var_{11} & \Delta Var_{12} & \ldots & \Delta Var_{1m} \\ \Delta Var_{21} & \Delta Var_{22} & \ldots & \Delta Var_{2m} \\ & & \ldots & \\ \Delta Var_{n1} & \Delta Var_{n2} & \ldots & \Delta Var_{nm} \end{bmatrix} = \quad (1)$$

$$\underbrace{[\Delta P_2 \quad \Delta P_2 \quad \ldots \quad \Delta P_m]}_{\substack{Performance\ variations \\ (only\ for\ partition)}}$$

where n is the number of variables, m is the simulation count of MC, and ΔVar are the variable variations. Therefore, the output location of each sample at the "horizontal" axis is roughly known as illustrated in FIG. 5. Note that, for this example, the output distribution is not predicted, because the linear modeling error in equation (1) may induce an erroneous judgment, especially in the around-specification region 502. The tool uses equation (1) to find out the certain pass/fail samples (regions 501 and 503, respectively), whose output performances are far from (far better than or far worse than) specification. Therefore, the Ybest value and the worst performance sample can be obtained from these samples before running all MC simulations. As to the around-specification samples of region 502, simulations for these samples are intuitive to estimate the yield accurately. In order to reduce the simulation count, the "sample partition" and "probabilities filter" are provided to pick out the critical samples and simulate them only.

3.2 Sample Partition

Figure 6:
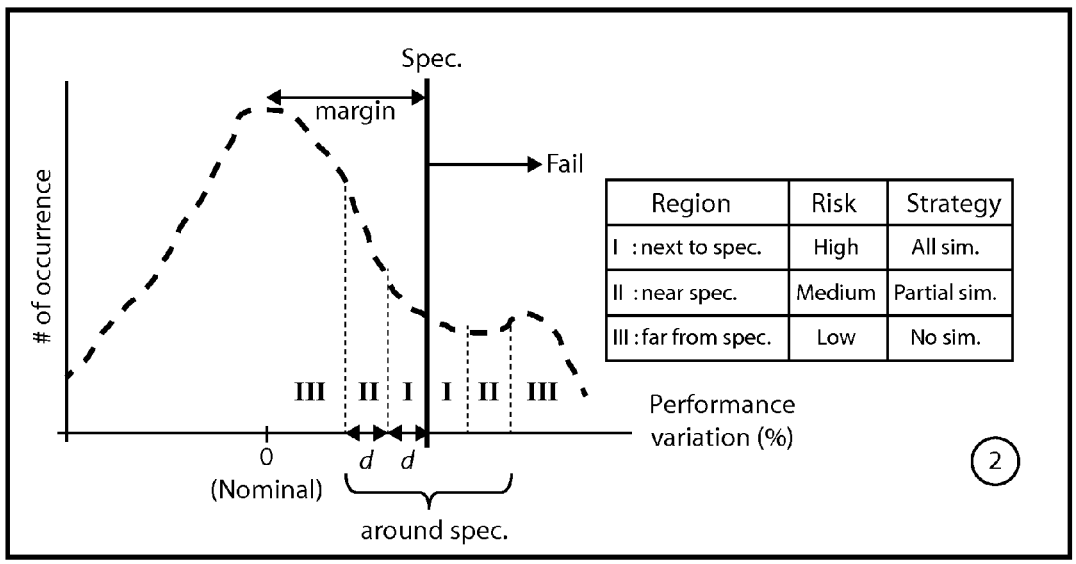
FIG. 6 is a diagram showing further partitioning of the sample space.

This section focuses on the around-specification region 502 of FIG. 5, and partition it into several parts based on the distance to specification (d), as shown in FIG. 6. The parameter d is relative to the distance from the nominal value to specification, which is called margin in this disclosure. The nominal value is the performance without any process variation effect. If the specification is closer to the nominal value, d should be smaller because checking the left side of nominal value in FIG. 6 is not necessary to find failed samples. This method divides the margin into k segments such that d can be calculated by d≈margin/k, where k is a user-given positive integer and margin is obtained by the specification value.

Region I in FIG. 6 represents the next-to-specification region. Any erroneous judgment (e.g., trimming important samples) in this region would induce significant errors in yield estimation. In other words, the trimmed-sample risk is high such that the tool simulates all samples in Region I. Region II indicates the around-specification region, for which there is less risk associated with trimming simulation samples. In some embodiments, a filter function is used to pick out critical samples for partial simulation in region II. As to the far-from-specification region III, the method assumes these samples certainly pass or certainly fail the specification without simulation. Such assumption is explained above.

The filter function for Region II is referred to herein as a "probability filter" 406 (FIG. 4), like the circuit features of a low/high pass filter. In this case, the probability filter includes a low probability pass filter and a high probability pass filter. Probability filter 406 filters out non-critical samples in Region II and selects partial samples for simulation.

3.3 Probability Filter

Section 2 pointed out the features of MC analysis: the probability of output performance is relative to the probability of input variables; the performances distributions have clusters and the probability of a process data point being far-from-cluster is much lower. The tool utilizes these features and proposes the "probability filter" to trim the samples in Region II.

Figure 7:
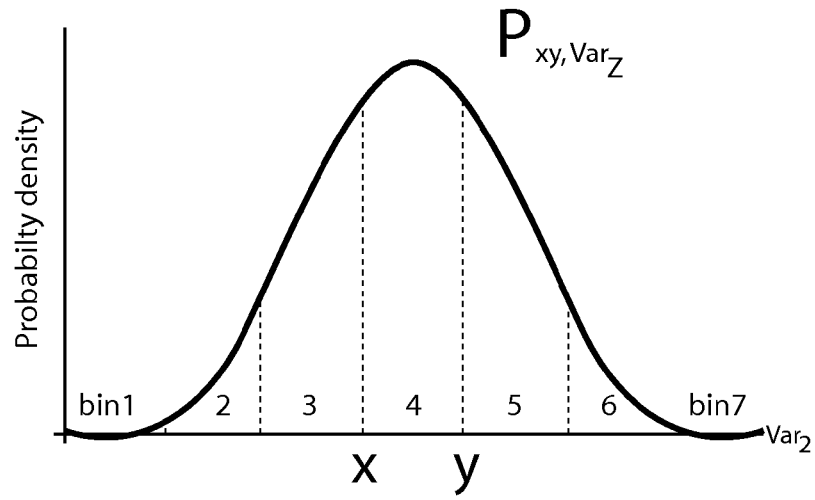
FIG. 7 is a diagram showing partitioning of the input space into bins.

The first step is to find the probability of each MC sample. This method divides the probability of one input variable into several bins (e.g., bins 1-7), as illustrated in FIG. 7. These bins have the same interval along the horizontal axis and an odd number of bins is selected for symmetry. All samples located in the same bin are assumed to have the same probability. $P_{xy}$, Varz in FIG. 7 represents the probability of an xy interval for certain variable ($Var_z$), and it can be derived from the cumulative distribution function (cdf) of Gaussian distributions. The cdf describes probabilities for a random variable to fall in the intervals of the form (∞, x] is shown in equation (2), where erf is the Gaussian error function.

$$\phi(x) = \frac{1}{\sqrt{2\pi}} \int_{-\infty}^{x} e^{-t^2/2} dt - \frac{1}{2}\left[1 + erf\left(\frac{x}{\sqrt{2}}\right)\right] x \in R$$

$$P_{xy,var_z} = \phi(y) - \phi(x)$$

$$P_{combine} = \prod_{z=1}^{m} P_{xy,var_z}$$

Then, the probability in the xy interval can be calculated by equation (3) for certain variable. Finally, the combination probability of all variables is expressed as the product of each variable's probability. Equation (4) is the combination probability of m variables if all variables locate in the xy interval.

Figure 8:
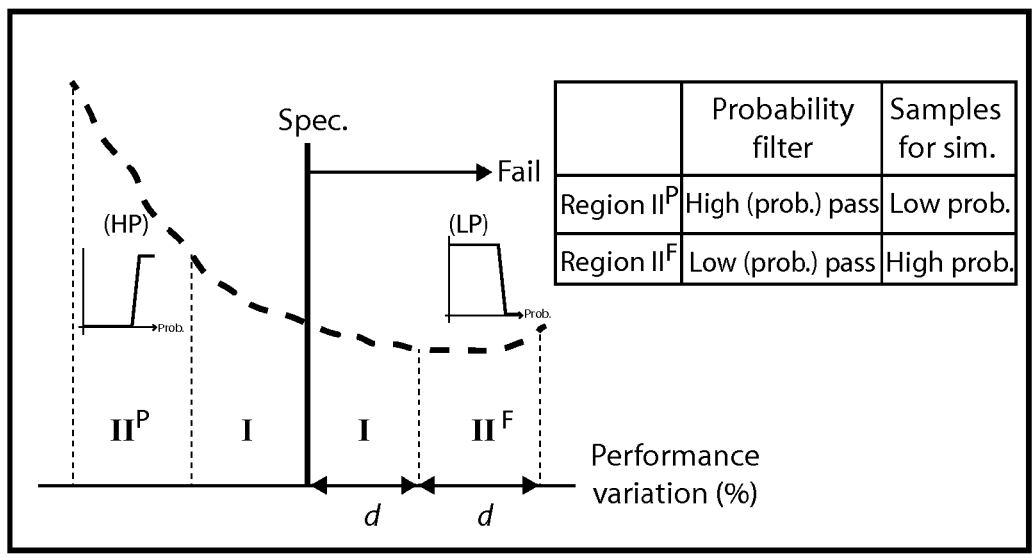
FIG. 8 is a diagram showing the operation of the high probability pass filter and low probability pass filter.

The tool calculates combination probabilities for all MC samples and normalizes them by the highest probability, as shown in FIG. 8. Then, the sample probabilities in Region II are analyzed and abnormal cases are selected for simulations. The probability far from the nominal value should be much smaller such that high probability samples in Region IIF of FIG. 8 may be abnormal, as show in FIG. 8. These abnormal cases may result from the error of location estimation in "sample analysis". Therefore, such high probabilities samples in Region IIF are selected for simulations to verify whether they are really failed. Like using a low (probability) pass filter, low probability samples in Region IIF are filtered out and they are directly treated as failed samples without simulations. In the same way, the low probability samples in Region IIP do not pass the high (probability) pass filter such that they need simulations for verification. In other words, only partial samples in Region II are to be simulated in the MC analysis. As to filter criteria, a tighter criteria pick out more simulation samples and makes the yield estimation more accurate with greater simulation cost. These parameters are flexible and can be adjusted according to different users' requirement for accuracy and/or simulation cost/time.

Finally, all MC samples are trimmed as a small group from Region I (all simulation) and II (partial simulation). In the next step, "sample grouping" refines these selected samples to avoid running multiple simulations of nearly identical data points.

3.4 Sample Grouping

As mentioned in Section 2, MC analysis sometimes generates similar values of input samples and simulates them repeatedly. In some MC simulators, the pseudo-random number generator has a sampling capability such that there are many similar input samples with similar output performances. That is, the pseudo-random number generator eventually generates numbers which are the same or very close to previously generated numbers. The "sample grouping" step gathers such samples and record the sample count. Then, these samples are replaced by an approximated single sample (e.g., by finding the centroid of the cluster of close input sample points) and only one simulation of the single sample is performed, representing the group of similar samples.

The sample grouping is indeed efficient in reducing simulation samples. However, grouping "all" MC samples to predict the shape of output distribution may have significant yield errors under certain specification values.

In some embodiments, only the selected samples, which are the small part of all MC samples, are used. Therefore, the grouping error should affect the yield estimation only slightly. Moreover, we do not predict the performance distribution such that this method has good accuracy under different specifications. Most importantly, this method can handle any number of variables, and is not limited to a single variable. For example, a complex semiconductor fabrication process can have 1000 variables; the method described herein can be used even for such a large number of input variables.

4. Yield-Aware Design Flow

MC analysis performs random sampling and runs a circuit in turn simulation on the sample. Such repeated action does not stop until the simulator finishes running all MC samples. After hundreds or thousands of simulations, designers can obtain the yield value and the worst performance under process variations. If the analyzed results are not satisfied, they need to fine-tune the design and run time-consuming MC simulation all over again. Such yield-aware design flow becomes difficult for large circuits because iterative MC simulations are very luxurious.

Therefore, a fast analyzer allows the designer to know the parametric variation effects on circuit performance during the design phase. This disclosure provides an efficient yield-aware design flow to speed up the process of iterative yield check. The provided trimmed-sample methodology can estimate the best possible yield (Ybest) and the worst performance value before running MC simulations. If the analyzed results are not satisfied, designers can start improving their circuit immediately, because the yield determined by MC is certainly worse, and would lead the designer to take the same course of action anyway. Therefore, this method can save the MC analysis if Ybest is worse than the target yield. The worst performance value is also a good reference for fine-tuning the design. The lower the worst performance value, the more the designer will want to improve the design performance. As to the real MC simulated yield value, only a relatively few simulations are used in this method to estimate accurate yield compared to traditional MC analysis. After several design iterations, the sign-off full MC simulation is only performed for more detailed analysis if such analysis is desired. The provided yield-aware design flow should be very useful for circuit designs.

This disclosure provides efficient trimmed-sample MC methodology and yield-aware design flow for circuits. The entire space of MC samples are trimmed to a small subset to avoid running all MC simulations. Only a few samples are simulated to estimate the yield value accurately. Moreover, this approach provides the best possible yield and the worst performance before MC simulations are performed, such that designers can start improving circuits earlier. Combining with LHS as an example, this method gives 29× to 54× speedup over traditional MC analysis and the yield estimation errors are all less than 1%. For system designs, the yield analysis flow provided is still efficient for high-level MC analysis.

In one example, the number of samples simulated by the MC simulator is reduced from about 1000 to about 35.

The method described above can be applied to any circuit type, any process, any MC simulator, and any design level (e.g., device, standard cell, function, IC).

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, when the computer program code is loaded into and executed by a computer, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods.

In some embodiments, a method includes (a) generating a set of samples, each sample representing a respective set of semiconductor fabrication process variation values; (b) selecting a first subset of the set of samples based on a probability of the set of semiconductor fabrication process variation values corresponding to each sample; (c) estimating a yield measure for a semiconductor product based on relative sizes of the set of samples and the first subset, without performing a Monte Carlo simulation; and (d) outputting an indication that a design modification is appropriate, if the estimated yield measure is below a specification yield value.

In some embodiments, a method includes (a) generating a set of samples, each sample representing a respective set of semiconductor fabrication process variation values; (b) selecting a first subset of the set of samples based on a probability of the set of semiconductor fabrication process variation values corresponding to each sample; (c) identifying at least one group of samples in the first subset having relatively close process variation values to each other; (d) substituting a single representative sample for the group of samples to form a second subset; (e) simulating performance of semiconductor devices fabricated using the fabrication parameter values corresponding to the second subset; and (f) outputting a yield of the semiconductor devices based on the simulating.

In some embodiments, a computer implemented tool comprises: a non-transitory computer readable storage medium storing data representing a device or circuit configuration and a probability density function of a process variable; and a processor configured for: generating a plurality of data representing a sample space of input process variations; partitioning the sample space into partitions based on distance between nominal conditions and the generated sample space data; filtering samples in at least one partition to form a first reduced sample set; combining samples representing close process variations to form a second reduced sample set; and simulating fabrication of the device or circuit using the second reduced sample set, to determine yield of the device or circuit.

Although the subject matter has been described in terms of exemplary embodiments, it is not limited thereto. Rather, the appended claims should be construed broadly, to include other variants and embodiments, which may be made by those skilled in the art.

What is claimed is:

1. A method comprising:
   (a) generating a set of samples, each sample representing a respective set of semiconductor fabrication process variation values;
   (b) selecting a first subset of the set of samples based on a probability of the set of semiconductor fabrication process variation values corresponding to each sample;
   (c) using a special purpose computer configured for estimating a yield measure for a semiconductor product based on relative sizes of the set of samples and the first subset, without performing a Monte Carlo simulation; and
   (d) outputting an indication that a design modification is appropriate, if the estimated yield measure is below a specification yield value.

2. The method of claim 1, wherein step (b) includes;
   partitioning the set of samples into partitions based on respective differences between process variation values corresponding to a specification value and individual values of the generated set of samples;
   including in the first subset, for those samples in one or more partitions having process variation values nearest the specification value; and
   excluding from the first subset, for those samples in one or more partitions farther from the specification value than the process variation values nearest the specification value.

3. The method of claim 2, wherein the excluding step comprises excluding from the first subset a partition containing samples having greater than a threshold probability of failing to meet the specification value.

4. The method of claim 2, further comprising including in the first subset one or more partitions containing samples having greater than a second threshold probability of meeting the specification value.

5. The method of claim 2, wherein step (b) further includes:
   determining respective relationships between integrated circuit performance and respective ones of a plurality of process input variables using sensitivity analysis; and
   the partitioning includes estimating differences between a nominal performance value and individual values of the generated set of samples based on the determined respective relationships.

6. The method of claim 1, wherein the estimated yield measure and integrated circuit performance statistic corners are given by:

$$Y_{best}=1-(N_{fail}/N_{total})$$

where: $Y_{best}$ is the estimated yield measure, $N_{fail}$ is a number of samples within the set of samples which have greater than a threshold probability of violating a specification value, and $N_{total}$ is a total number of samples in the set of samples.

7. The method of claim 6, wherein at least one of the group consisting of a best circuit performance and a worst circuit performance is found within members of the set of samples which have greater than a threshold probability of meeting and violating the specification value, respectively.

8. The method of claim 1, further comprising running a Monte Carlo simulation idler step (d), if the estimated yield measure is greater than or equal to the specification yield value.

9. The method of claim 8, further comprising, before running the Monte Carlo simulation:
   partitioning the set of samples into partitions based on respective differences between process variation values corresponding to a specification value and individual values of the generated set of samples;
   forming a simulation set to be used in the Monte Carlo simulation, the simulation set including those samples in one or more first partitions having process variation values nearest the specification value;
   further including in the simulation set a second subset of samples in one or more second partitions adjacent to the first partitions; and
   excluding from the simulation set those samples in partitions sufficiently far from process variation values corresponding to the specification value so has to have greater than a threshold probability of meeting the specification value, or greater than the threshold probability of failing to meet the specification value.

10. The method of claim 9, wherein the second subset of samples are selected from the one or more second partitions using a probability filter.

11. The method of claim 9, further comprising, before running the Monte Carlo simulation,
   identifying at least one group of samples in the simulation set having process variation values near to each other; and
   substituting a single representative sample for the at least one group of samples so as to reduce a size of the simulation set.

12. A method comprising
   (a) generating a set of samples, each sample representing a respective set of semiconductor fabrication process variation, values;
   (b) selecting a first subset of the set of samples based on a probability of the set of semiconductor fabrication process variation values corresponding to each sample;
   (c) identifying at least one group of samples in the first subset having process variation values close to each other;
   (d) substituting a single representative sample for the at least one group of samples to form a second subset;

(e) simulating, on a special purpose computer, a performance of semiconductor devices fabricated using fabrication parameter values corresponding to the second subset; and (f) outputting a yield of the semiconductor devices based on the simulating.

13. The method of claim 12, further comprising, before step (e):

estimating a yield measure for the semiconductor devices based on sizes of the set of samples and the first subset, without performing a Monte Carlo simulation; and outputting an indication that a design modification is appropriate, if the estimated yield measure is below a specification yield value.

14. The method of claim 13, further comprising:
using an EDA tool to perform the design modification; and
repeating steps (a) to (d) before performing step (e).

15. A computer implemented tool comprising:

a non-transitory computer readable storage medium storing data representing a configuration of a device or a circuit and a probability density function of a process variable; and a processor configured for:

generating a plurality of data representing a sample space of input process variations;

partitioning the sample space into partitions based on a distance between nominal conditions and the generated sample space data;

filtering samples in at least one partition to form a first reduced sample set;

combining samples representing close process variations to form a second reduced sample set; and simulating fabrication of the device or the circuit, using the second reduced sample set, to determine a yield of the device or the circuit.

16. The tool of claim 15, further comprising a computer implemented EDA tool configured to generate the data representing the configuration of the device or the circuit.

17. The tool of claim 15, wherein:

the first reduced sample set includes those samples in one or more partitions having process variation values nearest a specification value; and the first reduced sample set excludes those samples in one or more partitions farther from the specification value than the process variation values nearest the specification value.

18. The tool of claim 15, wherein the first reduced sample set excludes a partition containing samples having greater than a threshold probability of failing to meet the specification value.

19. The tool of claim 15, wherein the processor is configured for including in the first reduced sample set samples in one or more partitions containing samples having greater than a second threshold probability of meeting the specification value.

20. The tool of claim 15, wherein the processor is configured for:

determining respective relationships between an integrated circuit performance and respective ones of a plurality of process input variables using sensitivity analysis; and the partitioning includes estimating differences between a nominal performance value and individual values of the generated sample space data based on the determined respective relationships.

21. The tool of claim 15, wherein an estimated yield measure and integrated circuit performance statistic corners are given by:

$$Ybest = 1 - (Nfail/Ntotal)$$

where: Ybest is the estimated yield measure, Nfail is a number of samples within a set of samples which have greater than a threshold probability of violating the specification value, and Ntotal is a total number of samples in the set of samples.

22. The tool of claim 21, wherein the tool is configured to find at least one of the group consisting of a best circuit performance and a worst circuit performance within members of the set of samples which have greater than a threshold probability of meeting and violating the specification value, respectively.

* * * * *